United States Patent
Magnussen

(10) Patent No.: US 11,590,713 B2
(45) Date of Patent: Feb. 28, 2023

(54) SHIFTING LAYUP METHOD FOR STRUCTURAL COMPOSITE COMPONENTS WITH COMPLEX SURFACE GEOMETRY AND NON-LINEAR FIBER PATH

(71) Applicant: TPI Composites, Inc., Warren, RI (US)

(72) Inventor: Corey Magnussen, Pella, IA (US)

(73) Assignee: TPI Composites, Inc., Warren, RI (US)

( * ) Notice: Subject to any disclaimer, the term of this patent is extended or adjusted under 35 U.S.C. 154(b) by 0 days.

(21) Appl. No.: 17/228,062

(22) Filed: Apr. 12, 2021

(65) Prior Publication Data

US 2021/0308968 A1 Oct. 7, 2021

Related U.S. Application Data

(63) Continuation of application No. 16/130,545, filed on Sep. 13, 2018, now Pat. No. 10,974,470.

(60) Provisional application No. 62/682,622, filed on Jun. 8, 2018.

(51) Int. Cl.
```
B29C 70/30     (2006.01)
B29C 70/38     (2006.01)
F03D 1/06      (2006.01)
B29L 31/08     (2006.01)
B29K 105/08    (2006.01)
```

(52) U.S. Cl.
CPC ............ B29C 70/30 (2013.01); B29C 70/386 (2013.01); F03D 1/0675 (2013.01); *B29K 2105/0881* (2013.01); *B29L 2031/085* (2013.01)

(58) Field of Classification Search
CPC ............................ B29C 70/54; B29C 70/386
See application file for complete search history.

(56) References Cited

U.S. PATENT DOCUMENTS

| 10,974,470 B2 | 4/2021 | Magnussen |
| 2019/0375172 A1 | 12/2019 | Magnussen |

OTHER PUBLICATIONS

Zhu et al. "Automated Composite Fabric Layup for Wind Turbine Blades" (2017).*
Magnussen, "A fabric deformation methodology for the automation of fiber reinforced polymer composite manufacturing," Iowa State University Capstones, Theses and Dissertations (2011).
Zhu et al., "Automated Composite Fabric Layup for Wind Turbine Blades," Journal of Manufacturing Science and Engineering, (2016) vol. 00: pp. 000000-01-00000-10.

* cited by examiner

*Primary Examiner* — Austin Murata
(74) *Attorney, Agent, or Firm* — Stephen J. Kenny; Vincenzo DiMonaco; Foley Hoag LLP

(57) ABSTRACT

Shifting is a method for manipulating unidirectional non-crimp fabrics that allows for a curved fiber path along with compound surface geometry. The bases for shifting is understanding unidirectional (UD) non-crimp-fabrics (NCFs) as a semi-flexible prismatic linkage and planning manipulations such that the array of linkages can conform to the surface geometry and path plan within allowable manufacturing tolerances. This has applications in structural composite components such as the current trailing edge prefabricated unidirectional components for wind turbine blades, and for future wind turbine blade designs including a curve-linear spar cap.

14 Claims, 13 Drawing Sheets

SHIFTING LAYUP METHOD FOR STRUCTURAL COMPOSITE COMPONENTS WITH COMPLEX SURFACE GEOMETRY AND NON-LINEAR FIBER PATH

CROSS-REFERENCE TO RELATED APPLICATIONS

This application is a Continuation of and claims the benefit of priority under 35 USC 120 to U.S. patent application Ser. No. 16/130,545 filed Sep. 13, 2018, which claims the benefit under 35 USC 119 of priority to U.S. Provisional Application No. 62/682,622 filed Jun. 8, 2018, the entire contents of each are hereby incorporated by reference.

BACKGROUND OF THE DISCLOSED SUBJECT MATTER

Field of the Disclosed Subject Matter

The disclosed subject matter relates to a system and corresponding method for the automation of fiber reinforced polymer composite manufacturing, e.g., wind turbine blades. Particularly, the present disclosed subject matter converts the traditional layup process in wind blade manufacturing to a semi-automated assembly line-type process. The system disclosed herein describes a shifting technique to automate the manipulation and layup process of non-crimp fabric (NCF).

Description of Related Art

A variety of methods and systems are known for the manufacture of wind turbine blades. Generally, Vacuum Assisted Resin Transfer Molding (VARTM) process is widely used in the manufacture of wind turbine blades because of the lower cost compared to autoclaving.

The process begins with the application of dry fiber that is placed into the mold, which is referred to as the layup process. However, because of the flexibility of the fiber and non-prismatic geometries of the mold, layup is a very labor-intensive manual process; owing to the panel sizes and shear amount of fiber that needs to be placed.

During the layup process, 2D panels of fabric are manipulated manually in order to conform to the shape of the 3D mold; simply referred to as draping. When manipulating the fabric, the workers have to make many hand motions to the fabric to make sure that the fabric is in contact with the mold. If the fabric ply fails to be in contact with the mold, out-of-plane deformation will occur and can be considered as a defect if it is too severe. These hand motions are very difficult to replicate with a machine because the movements are sensory based and are not the same for multiple replications. The human interaction involved introduces error and variability to the layup process; additionally, the considerable labor and training on the layup process drives up the cost of the parts.

As evident from the related art, conventional layup methods often require significant amounts of human interaction and specialized training. There thus remains a need for an efficient and economic method and system for the automatic of the layup process that avoids the aforementioned costs.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a method of fabricating a composite fabric comprising: providing a continuous supply of composite non-crimp material; feeding the continuous supply of composite non-crimp material through at least one pair of rollers, the rollers having an arcuate outer surface configured to engage the continuous supply of composite material; performing a shifting operation on the continuous supply of composite material, the shifting operation performed continuously and synchronized with the feeding step; and depositing the shifted composite non-crimp material into a mold for a wind blade.

In some embodiments, the shifting operation forms a curve-linear spar cap and is achieved by feeding the laminate through two in-line pairs of rollers. In some embodiments, the external surfaces of the rollers have a curved or arcuate mating surface, e.g. a cylindrical shape, a parabolic shape, a bulbous shape.

In some embodiments, the outfeed roller is powered and the infeed roller is torque controlled to maintain tension in the supply fabric. The pair of rollers can be synchronized to rotate at the same speed and direction and duration.

In some embodiments, each roller is connected to a frame on a linear axis drive, which is perpendicular to the feed direction on the plane of the supply material fiber.

In some embodiments, the number of shifts is determined by amount of degradation of supply material structure.

In some embodiments, a pair of clamps open and close in tandem with the rollers.

In some embodiments, a shifting head is configured to shift fabrics of up to approximately 280 mm in width.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Figure 1:
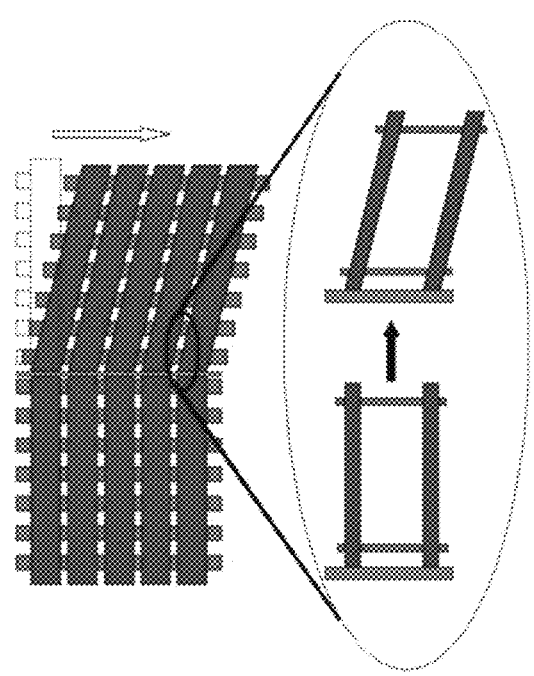
FIG. 1. depicts the process of shifting a layup segment.

Reference will now be made in detail to exemplary embodiments of the disclosed subject matter, an example of which is illustrated in the accompanying drawings. The method and corresponding steps of the disclosed subject matter will be described in conjunction with the detailed description of the system.

In the process of extracting the kinetic energy from the wind and transferring it to the power generators, blades are one of the most critical components of wind turbine systems. The geometry, structural strength and weight of the blades directly impact the efficiency of the turbine system, designers are continuously attempting to excel the aerodynamic characteristics of the blades while increasing the length and lowering the weight of the structure. To keep up with this dynamic design environment, fabrication methods are required to undergo continuous improvements as well. Employing the new emerging manufacturing technologies along with implementation of lean manufacturing techniques, the ultimate objectives of wind turbine blade manufacturers are improving the quality of blades while increasing the productivity and efficiency.

An assembly line-type operation is a semi-automated process in which sub-tasks are executed in a sequential manner to create an end product. From manufacturing to product development and even management, this methodology is being vastly employed to increase throughput. An aspect of the disclosed subject matter is to introduce and detail a novel system that improves wind blade manufacturing with unique assembly line methodology.

Manufacturing composite wind turbine blades using resin infusion method consists of three main steps; layup, infusion and mold closure. The former—layup—is the most human resource intense step and it has the most significant impact on the quality of the final product.

Unidirectional (UD) non-crimp-fabrics (NCFs) are commonly used as main structure components in the manufacture of large composite structures (e.g., wind turbine blades). These composite structures commonly require complex geometry, as this is one of the main advantages of using composite materials. This complex geometry can be made up of compound curvatures that requires fiber draping to conform the NCF to the desired surface.

Layup of curved fiber path components with compound curvature using UD NCFs is difficult to accomplish without creating distortions that reduce the structure of the component. Inherently, the use of a UD NCF requires that there be a desired nominal path for the fiber to follow. When this path becomes non-linear, the combination of the draping to meet the complex curvature, and non-linear fiber path can create fiber distortions that severely reduce the fatigue life of the component.

Processing by hand manipulates the NCF in a way that does not conform to the prismatic nature of the NCF at a fiber-level and results in non-productive distortions. UD NCF can be understood as a prismatic 4 sided linkage with semi-flexible linkages; however, these linkages must not violate certain constraints which are related to material composition and the particular application intended. This understanding leads to a controlled manipulation that reflects the prismatic nature of the NCF and results in controlled distortions within the path that is desired.

Improper draping of UD NCF causes severely reduced fatigue life of the overall component. Currently out-of-plane distortions are understood, and generally unacceptable, but in-plane distortions that are required are not consistently produced in a way that can be accounted for, resulting in the manufacture of components of compromised structural integrity. Accordingly, the shifting method disclosed herein allows for path planning and predictable in-plane distortion that can be accounted for, which in turn can reduce safety factors required in structural components.

Without a predictable method or good understanding of the distortion of UD NCFs, and manual, random layup of the material, high drapability, fabrics with a high shear locking angle must be used to create these structural components. This requires a lower areal weight in the fabric due to smaller fiber tows or loose packing and stitching. With the shifting method disclosed herein, a less drapable, and potentially higher areal weight fabric may be used, resulting in reduced a manufacturing cycle.

As disclosed herein, the automated shifting layup preforms the fabric to approximate the shape of the mold by shifting and then deposits the fabric into the mold. In this way the layup process can be completed with very little human interaction.

Shifting

Figure 2:
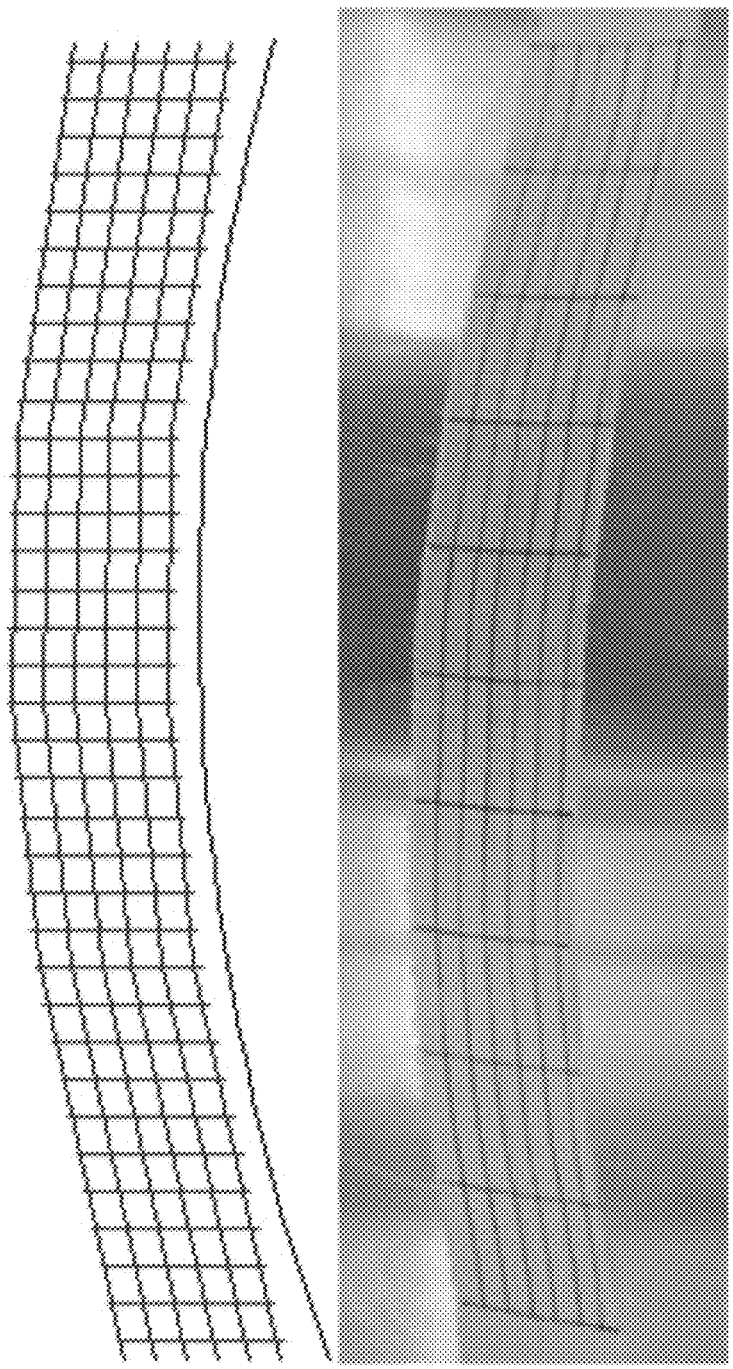
FIG. 2. depicts an example layup utilizing shifting.

A general description of the shifting method as applied to composite layup segments is provided in "AUTOMATED COMPOSITE FABRIC LAYUP FOR WIND TURBINE BLADES" by Matthew C. Frank, PhD, Siqi Zhu, and Frank E. Peters, PhD; the entire contents of which are hereby incorporated by reference. As described therein, the act of shifting includes clamping the fabric along fiber's weft directions and translating the free end parallel to the clamp in order to change the direction of the fiber, as schematically shown in FIG. 1. An exemplary layup segment which has undergone the shifting operation is depicted in FIG. 2.

Figure 3:
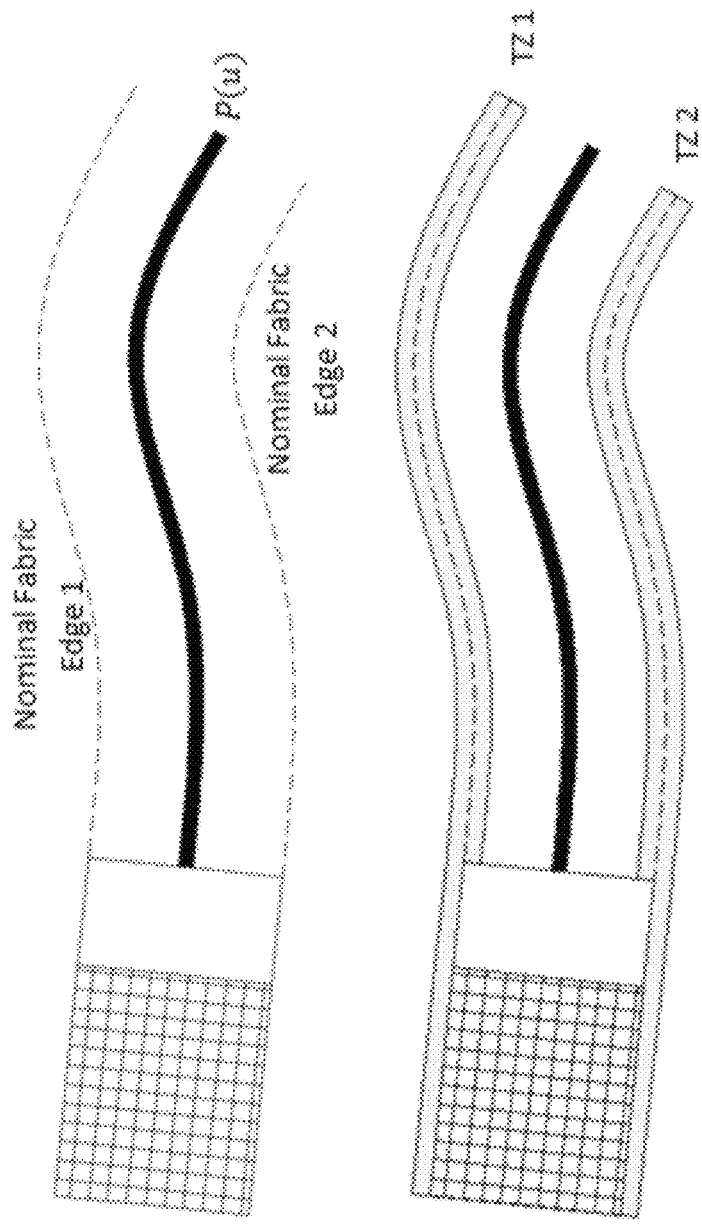
FIG. 3. depicts the guide curve and the tolerance zones of the layup resulting from the shifting process.

A mathematical representation of the shifting method can be denoted by a guide curve, P(u), which defines the nominal center of the fabric. Additionally, the fabric width and placement tolerance are used to create a tolerance zone (TZ), as depicted in FIG. 3. To create these tolerance zones, the guide curve is offset in both directions by one half of the fabric width to form the nominal edge location curves. Each nominal edge location curve is then offset in both directions by the amount of the placement variation allowed in order to form the tolerance curves. The area around each nominal edge location curve between the tolerance curves is then the acceptable region for the fabric edge, referred to here as Tolerance Zone 1 (TZ 1) and Tolerance Zone 2 (TZ 2).

Figure 4:
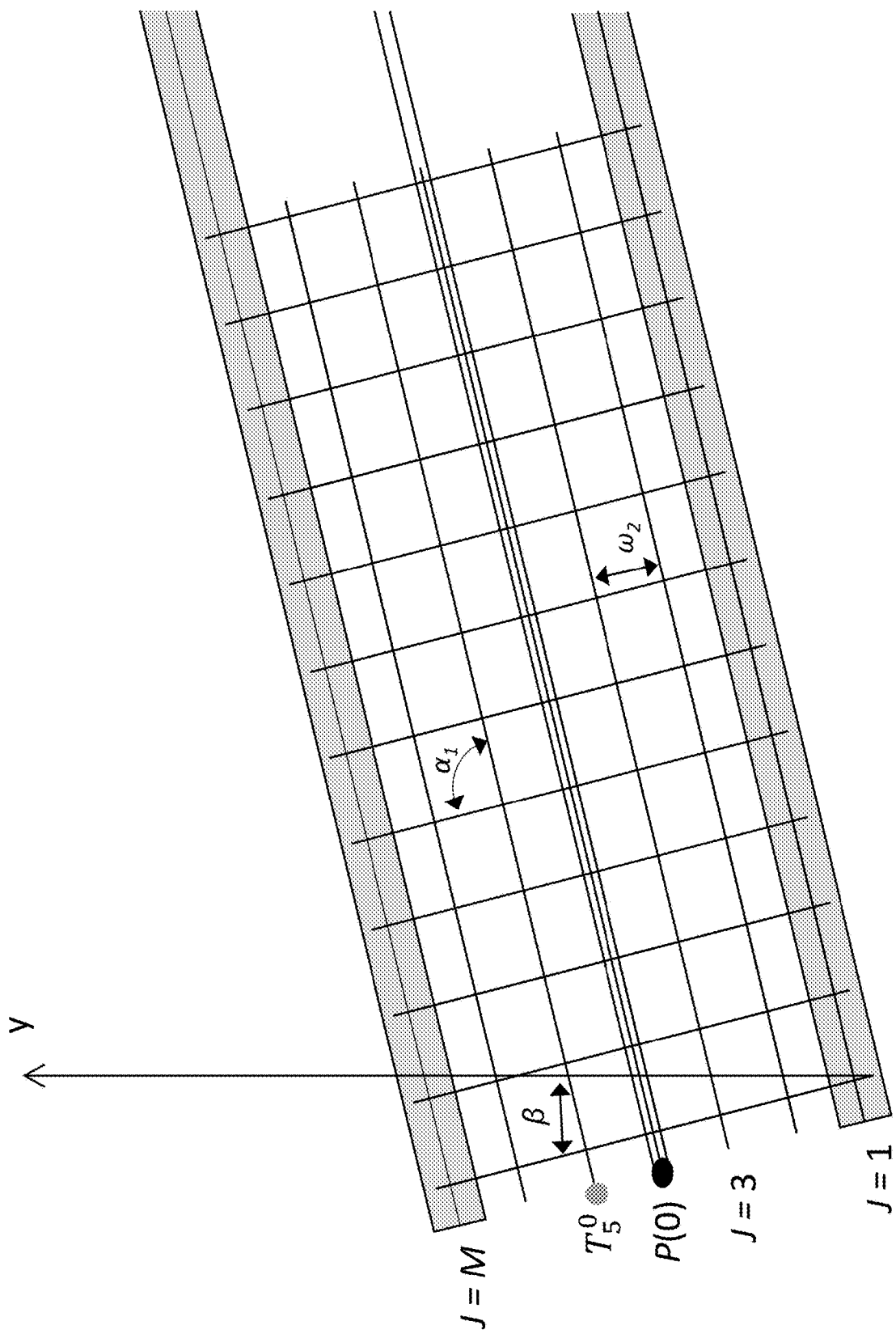
FIG. 4. depicts the start position of a tow.

The beginning position of any tow, j, as seen in FIG. 4, can be calculated as:

$$T_j^0 \begin{bmatrix} x \\ y \end{bmatrix} = P(0) + [2(j-0.5) - M]\omega_1 \begin{bmatrix} \cos(\beta + \alpha_1) \\ \sin(\beta + \alpha_1) \end{bmatrix}$$

Where M is the number of tows in the fabric, $\alpha_0$ is the nominal shear angle, and $\omega_0$ is the tow spacing at $\alpha_0$. For unidirectional fabrics, $\alpha_0$ is 90°. Also, $\alpha_1$ is the pre-shear angle. Pre-shear is the shear angle of the fabric at the beginning of the layup. This can be changed to minimize the overall shear angle or change the shear angle in specific locations throughout the layup. All values for $\alpha$ must remain between $-\alpha_c$ and $\alpha_c$, which represent the negative and positive shear lock limits.

Figure 5:
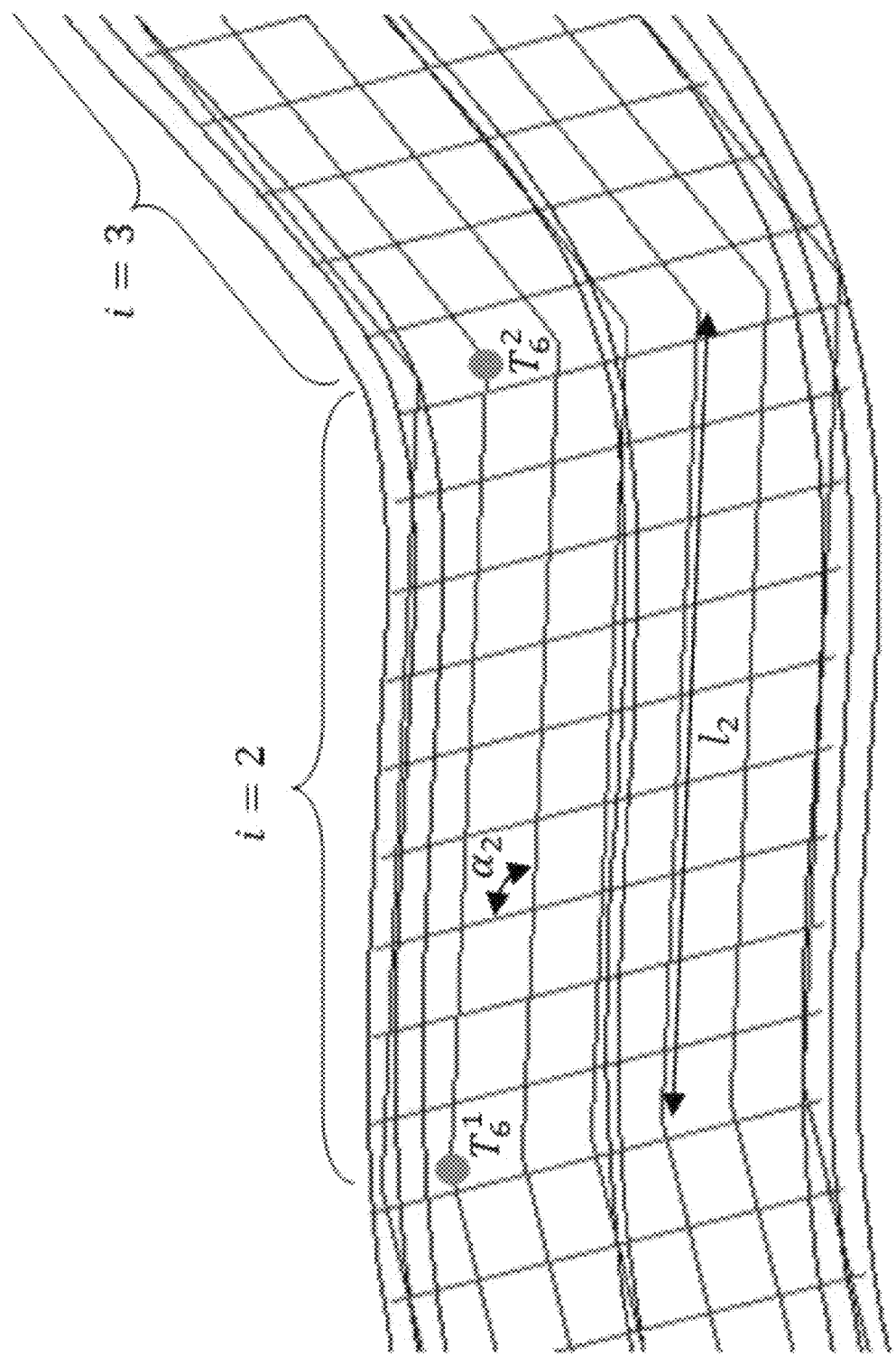
FIG. 5. depicts the variables of the fabric.

The location of any tow j at the end of any section, i, can be represented as:

$$T_j^i \begin{bmatrix} x \\ y \end{bmatrix} = T_j^{i-1} \begin{bmatrix} x \\ y \end{bmatrix} + l_i \begin{bmatrix} \cos(\beta + \alpha_i) \\ \sin(\beta + \alpha_i) \end{bmatrix}$$

Where $l_i$ is the length of each tow in section i, and $\alpha_i$ is the shear angle in section i (as shown in FIG. 5).

Figure 6:
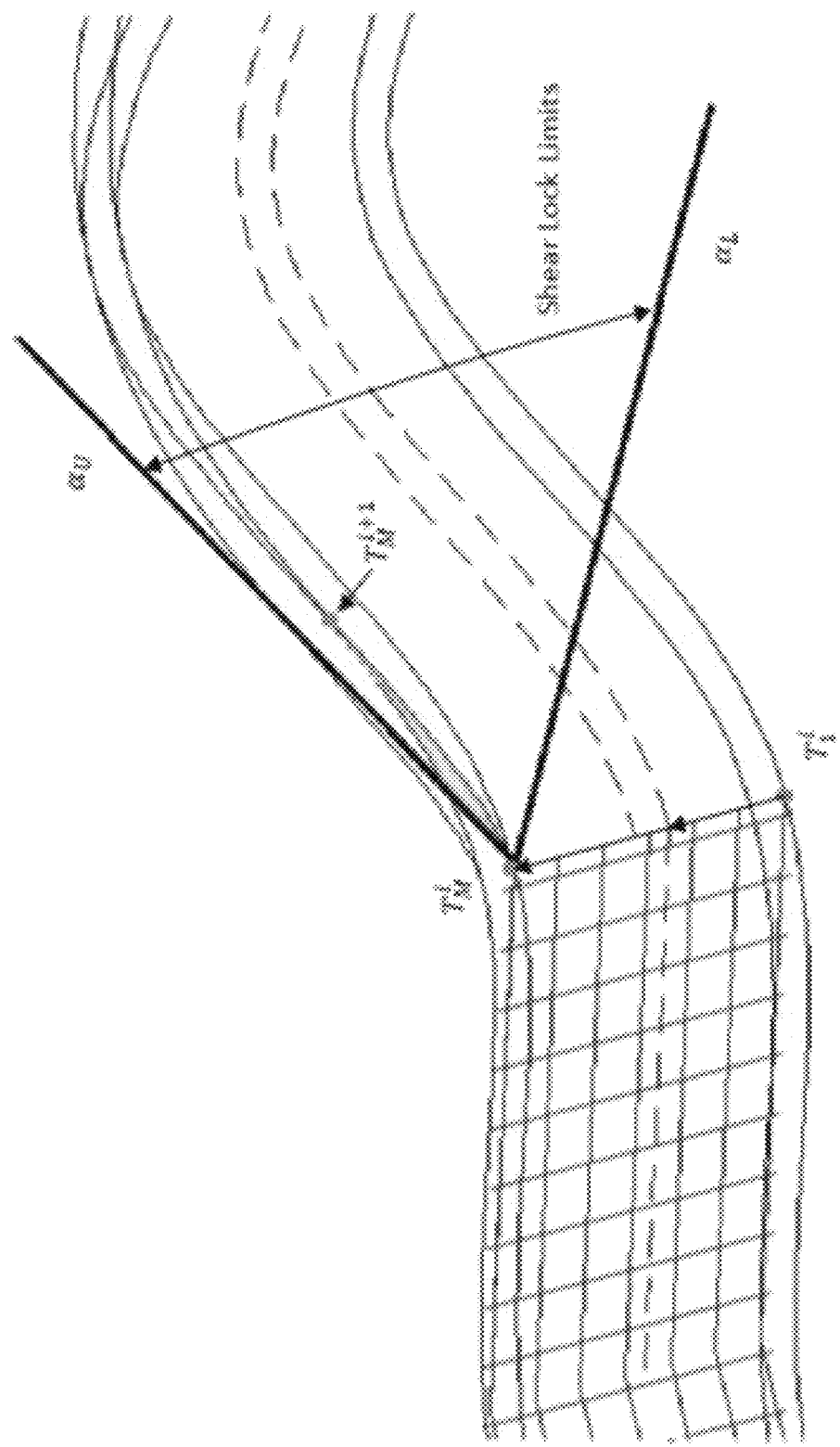
FIG. 6. depicts a shifting path calculation.

To determine these values, $T_1^{i+1}$ and $T_M^{i+1}$ are evaluated within TZ 1 and TZ 2 respectively. To do this, TZ 2 is translated along $[T_1^i - T_M^i]$ so that $T_1^i$ and $T_M^i$ are at the same point. The possible locations for $T_1^{i+1}$ are, then, any point between $-\alpha_c$ and $\alpha_c$ that is visible from $T_1^i$ without intersecting one of the four tolerance curves as shown in FIG. 6. The point in this region furthest from $T_1^i$ is then selected as $T_1^{i+1}$. From this, $l_{i+1}$, $\alpha_{i+1}$, $\omega_{i+1}$, and all other $T_j^{i+1}$ values can be calculated.

Figure 7:
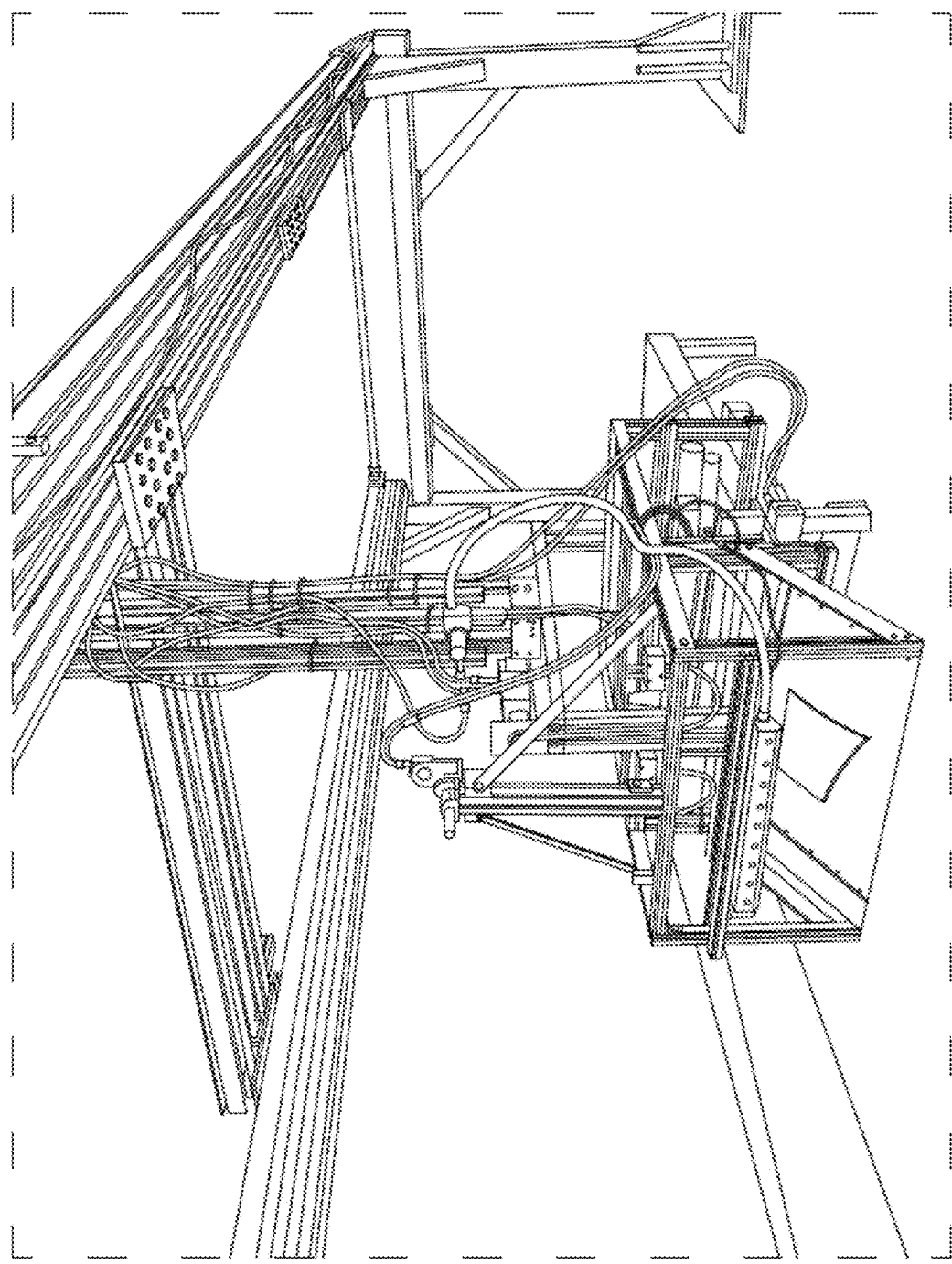
FIGS. 7-8 depict the shifting apparatus
Figure 8:
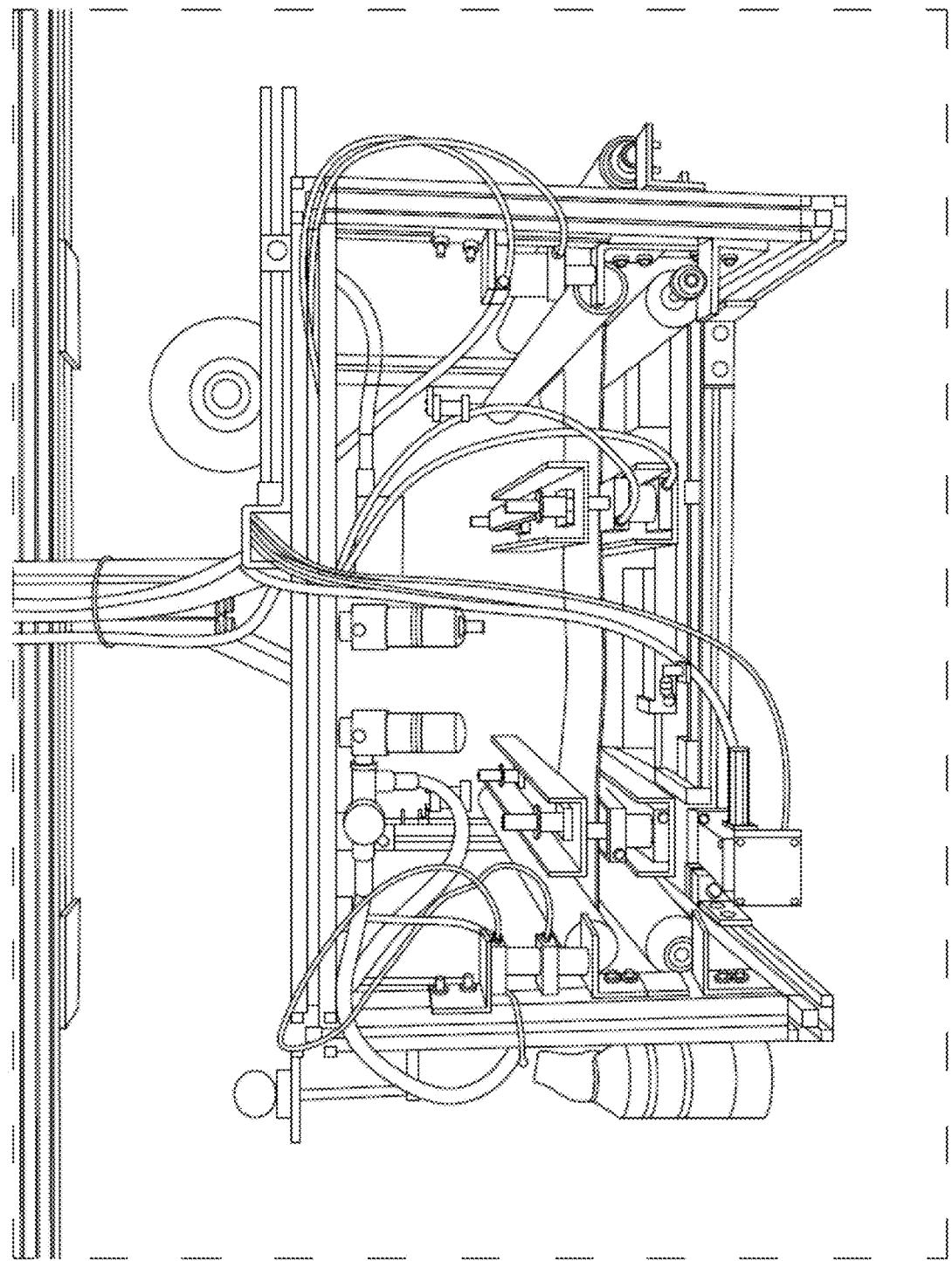

FIGS. 7-8 depict exemplary apparatus for performing the shifting technique disclosed herein, which includes a reference sphere, a fabric roll, rear pinch rollers, a shifting clamp, a spacing clamp. The machine depicted in FIG. 7 consists of two parts, a three-axis gantry system and four-axis shifting head. The shifting head and gantry system work in coordinated motion to sequentially shift-deform and deposit the shifted fabric onto a test mold surface. In this exemplary embodiment, the shifting head is configured to shift fabrics of up to 280 mm in width.

Figure 9:
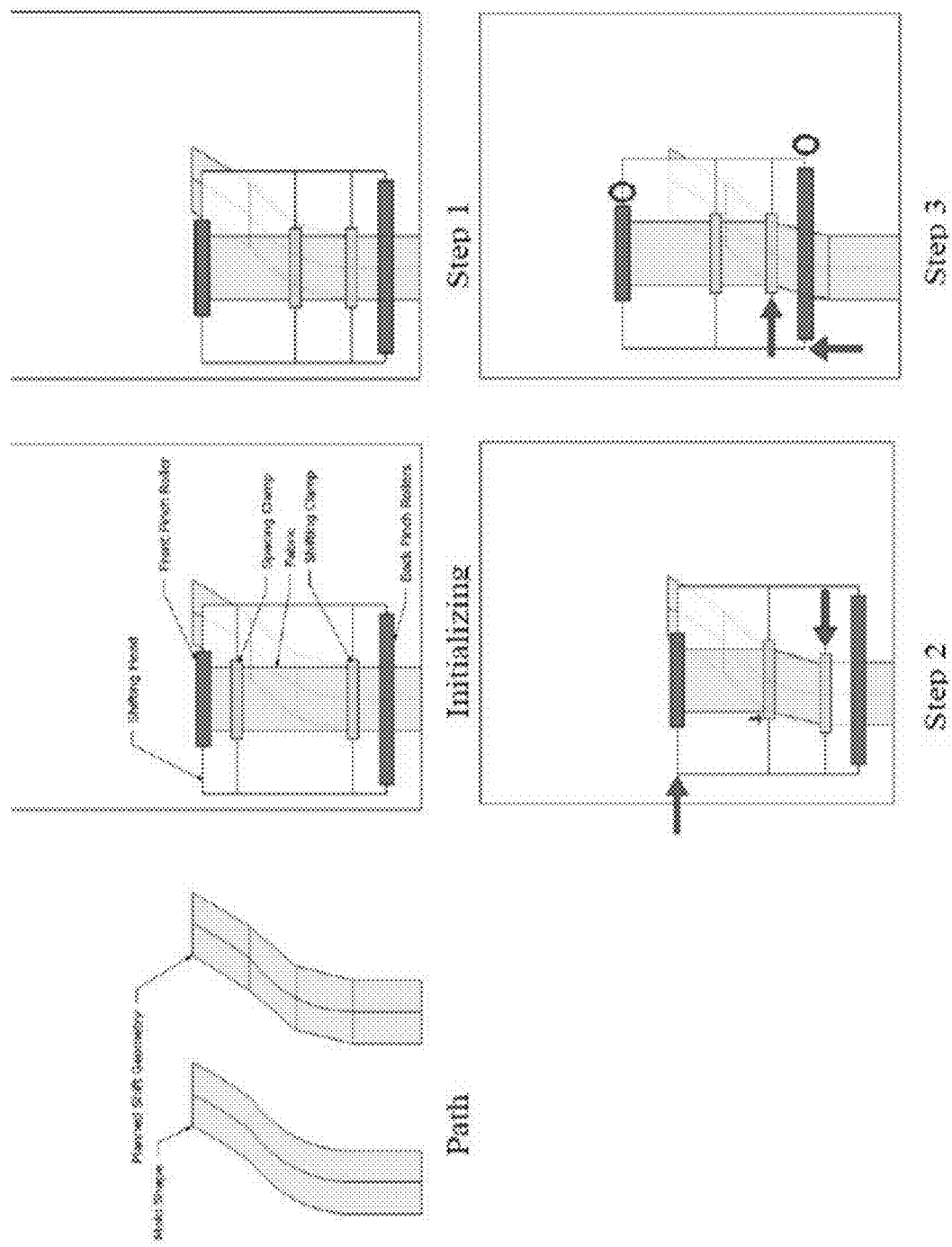
FIG. 9 depicts the working procedure of the shifting apparatus.

The machine creates a shift in a cycle of coordinated motions. In each cycle, the machine feeds straight fabric from the fabric roll, shifts the fabric to a certain shape, deposits the shifted fabric onto the mold and then prepares for the next cycle. Successive cycles of shifting will result in a piece of fabric with a curved shape. The work procedure of the shifting machine is shown in FIG. 9 and explained below.

The operation of the apparatus depicted in FIGS. 7-8 include the following sequence:

Initialize: The shifting head moves to start position.

Step 1: Spacing clamp moves to corresponding position according to the length of shift section.

Step 2: First, both rollers open and both clamps close to grip the fabric. Next, the gantry moves the entire shifting head to position the spacing clamp while shifting clamp synchronously moves the opposite direction to maintain position relative to the mold. At the same time the spacing clamp moves toward the back roller to compensate for the length reduction of the shifted fabric.

Step 3: Both clamps open and both rollers close. Next, the entire frame moves forward to the next shift position as the rollers feed fabric accordingly. The shifting clamp moves back to center synchronously. At this point, the cycle is finished and the next cycle starts from Step 1.

The shifting method disclosed herein is primarily intended for unidirectional fabrics, where the fabric is sequentially constrained and then rotated about a deformation angle to approximate curvature. Shifting can be conducted in a 2D plane, making the process easier to control and automate, and in some embodiments can be performed in three dimensions directly within a mold, or after a ply kitting process and then manually placed within the mold.

The methods and systems presented herein may be used for manufacture of large composite structures. The disclosed subject matter is particularly suited for the manufacture of wind turbine blades. For purpose of explanation and illustration, and not limitation, an exemplary embodiment of the system in accordance with the disclosed subject matter is shown in FIG. 7 and is designated generally by reference character 100. Similar reference numerals (differentiated by the leading numeral) may be provided among the various views and Figures presented herein to denote functionally corresponding, but not necessarily identical structures.

Exemplary Embodiment

In accordance with an aspect of the disclosure, the shifting method disclosed herein identifies UD NCF as a prismatic linkage system and develops a path planning for a curved path, both of each local layup segment as well as the global component, that allows for curved surface conformance while maintaining the structure of the component by choosing an acceptable number of discrete shifts. In some embodiments, the number of acceptable shifts is determined by looking at the degradation of structure (e.g. predictable based on the fatigue data shown) in comparison with the design requirements (e.g. weight, thickness, structural integrity, etc.) of the component. This can be optimized by changing the number of layers and the number of shifts. For purpose of illustration and not limitation, a fabric segment with 10 layers with 3 shifts each may have the same strength as 8 layers with 6 shifts each. The second controlling factor is the tolerance of the path provided. More shifts are required to comply with a tighter path tolerance. This allows for a close approximation of the curved path along complex geometry, and greatly reduces the effort required to make the NCF comply with the required geometry.

The shifting method disclosed herein takes advantage of the fiber-level structure of the UD NCF to allow for compliance to the fiber path without out-of-plane fiber distortion. Furthermore, the in-plane distortion that is required for the shifting method can be controlled by increasing the distortion points and offsetting between adjacent layers, as described above with respect to the number of acceptable shifts. A benefit of this approach is that it allows for the rapid approximation of the fatigue life of a linear structure of the same merits or design specifications.

Mathematical models can be used to calculate distortion points to satisfy both the curvature and structure requirements of a component in a predictable manner which can make these components, particularly large-scale components such as wind turbine blades, feasible to manufacture with predictable fatigue life and structure. Another advantage of the disclosed method is that, because the shifting method is based on a mathematical model, and is repeatable, it also facilitates automated methods that produce high repeatability UD NCF components.

In some embodiments the path plan can be carried out manually, in other embodiments it can be wholly automated or have select portions carried out automatically. This automation allows for creation of fabric layup for components that would be difficult or impossible otherwise. Additionally, the system and method disclosed herein generates a path plan (e.g. based on length, width, thickness inputs) which makes the component easier to manufacture, provides a better structural understanding of the component, and presents a viable solution for automated manufacturing.

The shifting technique disclosed herein can be employed in the manufacture of various components of a wind turbine blade. For example, the present disclosure can be utilized to produce a curve-linear spar cap, which would be advantageous in that it would facilitate aeroelastically induced bend-twist coupling of a wind turbine blade for load mitigation. Additionally, or alternatively, the shifting method disclosed herein can be used to produce a spar cap that has the necessary fiber path, while also allowing for the necessary complex curvature of the surface. Furthermore, the shifting method may also allow for a better structural confidence in the component.

Currently prefabricated components are used in the trailing edge of wind turbine blades to prevent edge-wise bending moments in the blade. The shifting method could reduce the manufacturing cost of producing these components by reducing the technique and skill required to place these fabrics, and increasing the areal weight of the fabric resulting in fewer fabric layers in a single component.

Figure 10:
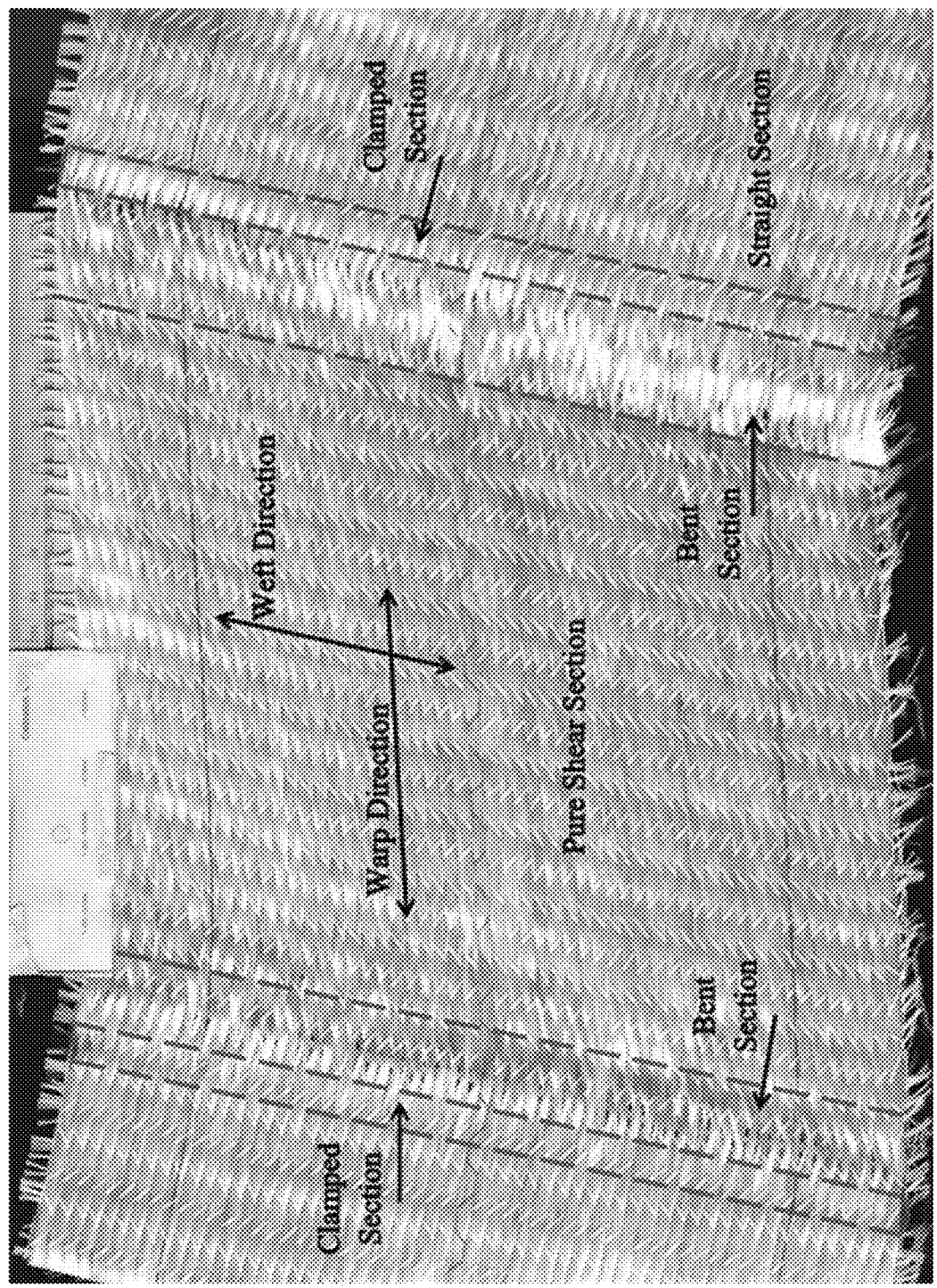
FIG. 10 depicts a mesoscale view of a shifted fabric.

FIG. 10 depicts the result on the shifted fabric revealing that most of the unidirectional tows were subjected to pure shear, while the tows adjacent to the clamps are subjected to bending. Tow separation in the bent section occurs when the shift angle is close to shear locking limit. The deformation is small enough, i.e. within acceptable tolerances for wind blade manufacturing, where shift angle is to be kept well below shear locking limit for most commonly used fabrics.

Continuous Shifting

In accordance with another aspect of the disclosure, a continuous shifting apparatus and method can be employed (instead of, or in addition to, the discrete segmented shifts described above which are performed as separate steps in a cycle).

Figure 11:
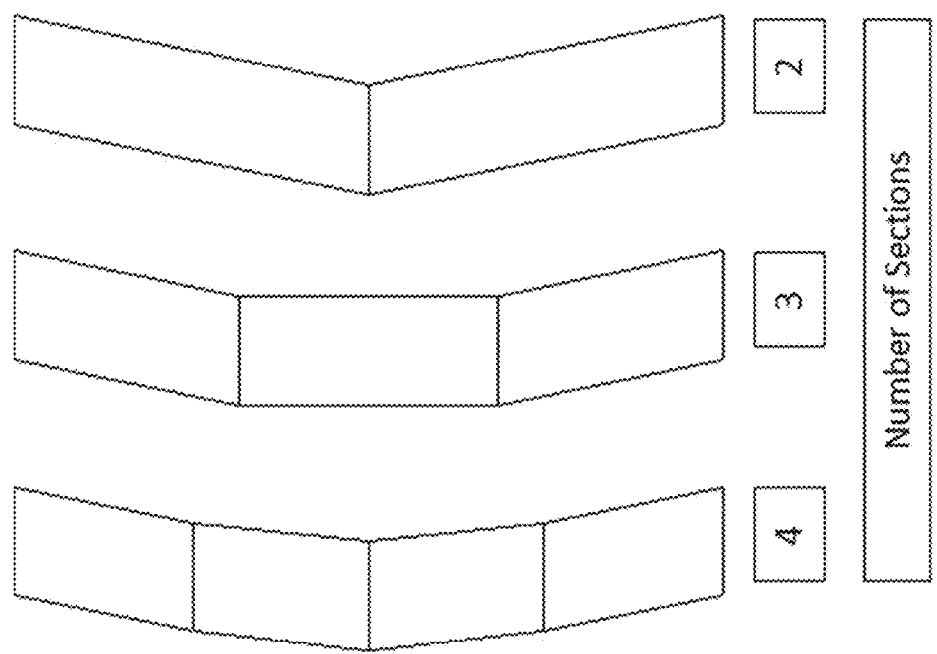
FIG. 11 depicts the shape of test coupons.
Figure 12:
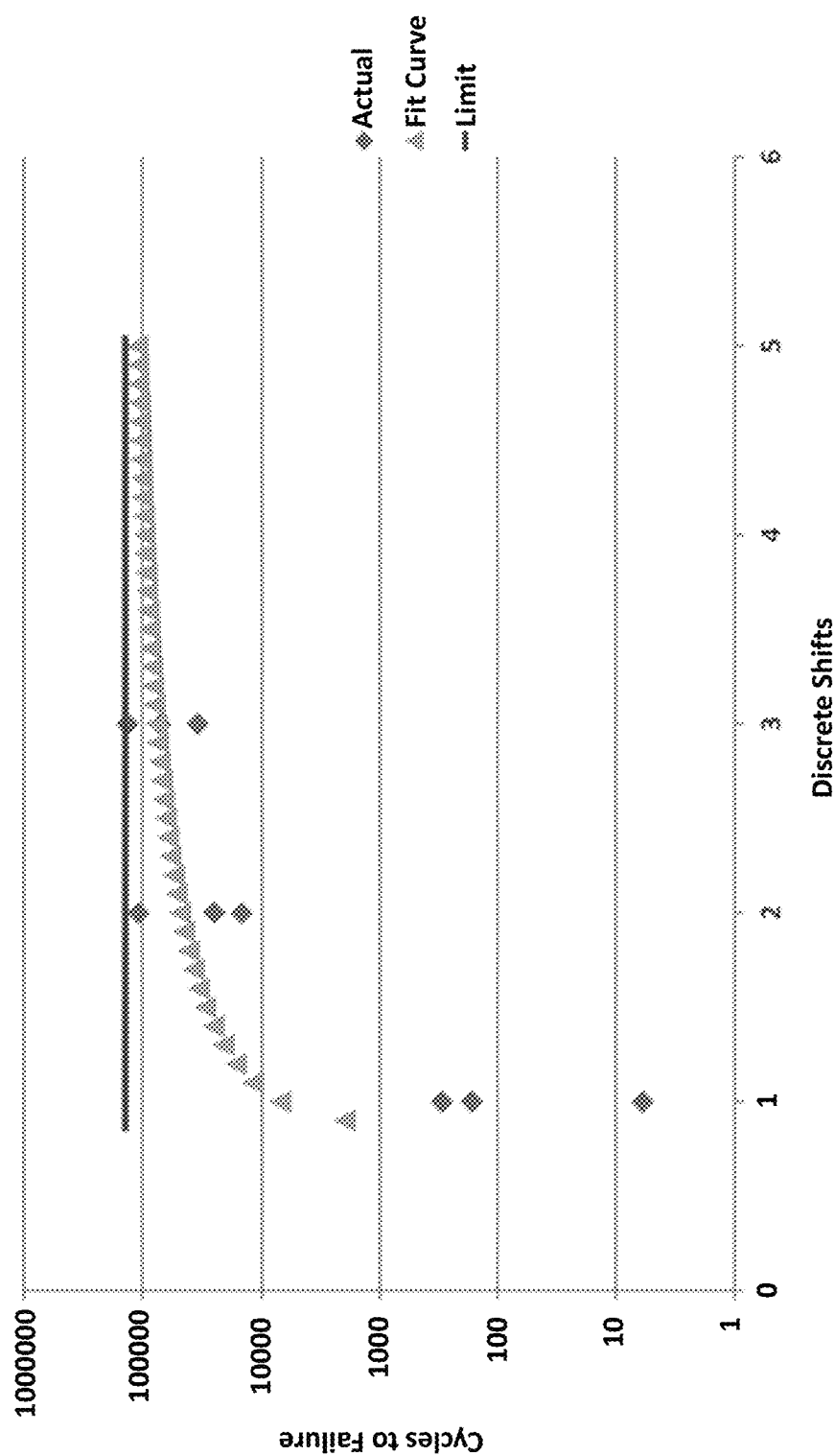
FIG. 12 depicts the effect of discrete shift quantity on fatigue life of the coupon.

In this regard, and as demonstrated in FIGS. 11-12, as the number of discrete shifts used is increased, the fatigue life of the laminate approaches the fatigue life of a linear laminate. Accordingly, by using a continuous shift, the fatigue life of the laminate can be statistically similar to that of linear laminate, or at least maximized. Such a continuous shifting technique is advantageous in that it increases output, and provides greater consistency across the shifted layup segments.

Figure 13B:
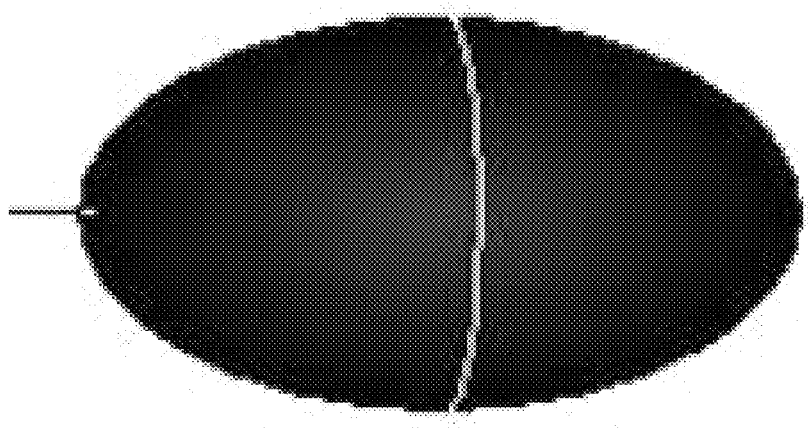
FIGS. 13A-B depict exemplary rollers for use in a continuous shifting operation.
Figure 13A:
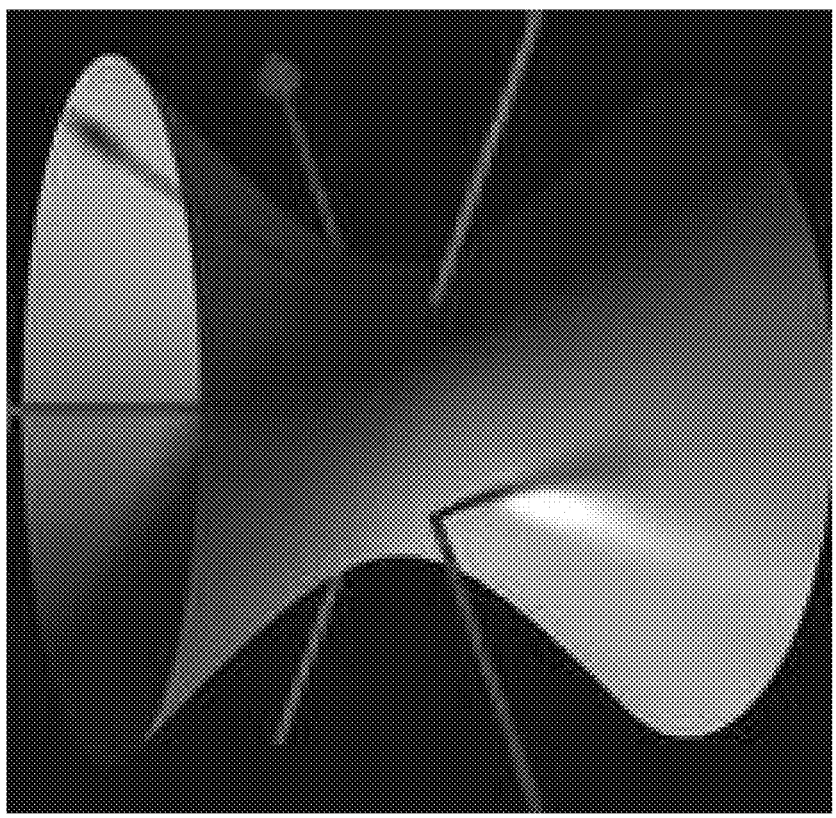

In an exemplary embodiment, this continuous shifting is achieved by feeding the laminate through two in-line pairs of rollers. The rollers can be formed with a soft/malleable material (e.g. neoprene or rubber) on an external surface (the cores of such rollers can be more rigid if desired). The external surfaces of the rollers can be formed with a curved or arcuate mating surface (e.g. cylindrical, bulbous, parabolic, etc.) to engage the feed supply. For purpose of illustration and not limitation, some exemplary roller shapes are provided in FIG. 13. The curved mating surface ensures that a single tow in the fabric serves as the master as the linear speed of the roller pulling the fabric would vary across the width of the fabric. The outfeed roller can be powered, and the pair of rollers synced, while the infeed can be torque controlled to maintain tension in the fabric.

Each of these roller pairs can be connected to the machine body on a linear axis drive which is perpendicular to the feed direction on the plane of the fiber. As the drive rollers pull fabric through the machine, the linear axis drives translate accordingly to distort the fabric. This creates a continuous shift through the length of the fabric, based on the path plan.

In some embodiments, the machine body can be mounted to a CNC controlled gantry, or to a robotic arm, so that as the fabric is dispensed from the machine, it would be laid into position on the mold.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

The invention claimed is:

1. A method of fabricating a composite fabric for a wind turbine blade comprising:
   providing a continuous supply of unidirectional non-crimp composite material;
   feeding the continuous supply of unidirectional non-crimp composite material through at least one pair of rollers,
      the rollers having an arcuate outer surface configured to engage the continuous supply of unidirectional non-crimp composite material;
   performing a shifting operation on the continuous supply of unidirectional non-crimp composite material,
      the shifting operation performed continuously and synchronized with the feeding step; and
   depositing the shifted unidirectional non-crimp composite material into a mold for a wind turbine blade;
   forming a plurality of layers of the deposited shifted unidirectional non-crimp composite material into a curved configuration;
   wherein the rollers are connected to a frame on a linear axis drive, which is perpendicular to the feed direction on the plane of the supply material fiber; and
   wherein the pair of rollers are synchronized to rotate at the same speed, direction and duration.

2. The method of claim 1, wherein the linear axis drive translates as the composite material is fed through the rollers.

3. The method of claim 1, wherein the rollers have a malleable external surface and a rigid core.

4. The method of claim 1, wherein the rollers have a parabolic shape.

5. The method of claim 1, wherein the rollers have a cylindrical shape.

6. The method of claim 1, wherein the continuous shifting is achieved by feeding the unidirectional non-crimp composite material through two in-line pairs of rollers.

7. The method of claim 1, wherein an outfeed roller is powered.

8. The method of claim 1, wherein an infeed roller is torque controlled to maintain tension in the unidirectional non-crimp composite material.

9. The method of claim 1, wherein the number of shifts is determined by an amount of degradation of supply material structure.

10. The method of claim 1, wherein a pair of clamps open and close in tandem with the rollers.

11. The method of claim 1, wherein a shifting head is configured to shift fabrics of up to approximately 280 mm in width.

12. The method of claim 1, wherein the shifting operation forms a curve-linear spar cap.

13. A method of fabricating a composite fabric for a wind turbine blade comprising:
- providing a continuous supply of unidirectional non-crimp composite material;
- feeding the continuous supply of unidirectional non-crimp composite material through at least one pair of rollers,
  - the rollers having an arcuate outer surface configured to engage the continuous supply of unidirectional non-crimp composite material;
- performing a shifting operation on the continuous supply of unidirectional non-crimp composite material,
  - the shifting operation performed continuously and synchronized with the feeding step; and
- depositing the shifted unidirectional non-crimp composite material into a mold for a wind turbine blade;
- forming a plurality of layers of the deposited shifted unidirectional non-crimp composite material into a curved configuration;
- wherein the rollers are connected to a frame on a linear axis drive, which is perpendicular to the feed direction on the plane of the supply material fiber; and
- wherein the linear axis drive translates as the composite material is fed through the rollers.

14. A method of fabricating a composite fabric for a wind turbine blade comprising:
- providing a continuous supply of unidirectional non-crimp composite material;
- feeding the continuous supply of unidirectional non-crimp composite material through at least one pair of rollers,
  - the rollers having an arcuate outer surface configured to engage the continuous supply of unidirectional non-crimp composite material;
- performing a shifting operation on the continuous supply of unidirectional non-crimp composite material,
  - the shifting operation performed continuously and synchronized with the feeding step; and
- depositing the shifted unidirectional non-crimp composite material into a mold for a wind turbine blade;
- forming a plurality of layers of the deposited shifted unidirectional non-crimp composite material into a curved configuration;
- wherein the rollers are connected to a frame on a linear axis drive, which is perpendicular to the feed direction on the plane of the supply material fiber; and
- wherein an infeed roller is torque controlled to maintain tension in the unidirectional non-crimp composite material.

* * * * *